(12) United States Patent
du Toit et al.

(10) Patent No.: US 8,725,305 B2
(45) Date of Patent: May 13, 2014

(54) POWER DISTRIBUTION NETWORK FAULT MANAGEMENT

(75) Inventors: Willem Hendrik du Toit, Cochrane (CA); Jiyuan Fan, Duluth, GA (US); Bogdan Cristian Popescu, Calgary (CA)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 13/220,192

(22) Filed: Aug. 29, 2011

(65) Prior Publication Data

US 2013/0054042 A1    Feb. 28, 2013

(51) Int. Cl.
*G05D 11/00*    (2006.01)

(52) U.S. Cl.
USPC ................................ 700/292; 361/64; 702/64

(58) Field of Classification Search
USPC .................................. 700/292; 361/64; 702/64
See application file for complete search history.

(56) References Cited

U.S. PATENT DOCUMENTS

| | | | |
|---|---|---|---|
| 5,303,112 A | 4/1994 | Zulaski et al. | |
| 5,513,061 A | 4/1996 | Gelbien et al. | |
| 5,525,898 A | 6/1996 | Lee, Jr. et al. | |
| 5,701,226 A | 12/1997 | Gelbien et al. | |
| 5,973,899 A | 10/1999 | Williams et al. | |
| 6,002,260 A | 12/1999 | Lau et al. | |
| 6,018,449 A | 1/2000 | Nelson et al. | |
| 6,111,735 A | 8/2000 | Nelson et al. | |
| 6,243,244 B1 | 6/2001 | Nelson et al. | |
| 6,275,366 B1 | 8/2001 | Gelbien et al. | |
| 6,292,340 B1 | 9/2001 | O'Regan et al. | |
| 6,347,027 B1 | 2/2002 | Nelson et al. | |
| 6,363,057 B1 | 3/2002 | Ardalan et al. | |
| 6,480,748 B1 * | 11/2002 | Gerszberg et al. | ............... 700/21 |
| 6,687,573 B2 | 2/2004 | Egolf et al. | |
| 6,697,240 B2 | 2/2004 | Nelson et al. | |
| 6,813,571 B2 | 11/2004 | Lightbody et al. | |
| 6,867,958 B2 | 3/2005 | McClure et al. | |
| 6,907,321 B2 | 6/2005 | Kearney et al. | |
| 6,988,025 B2 * | 1/2006 | Ransom et al. | ............... 700/295 |
| 6,988,182 B2 * | 1/2006 | Teachman et al. | ............... 712/37 |
| 7,065,457 B1 | 6/2006 | Germer et al. | |
| 7,085,824 B2 | 8/2006 | Forth et al. | |

(Continued)

FOREIGN PATENT DOCUMENTS

| | | |
|---|---|---|
| EP | 1443624 A1 | 4/2004 |
| WO | 0048283 | 8/2000 |

(Continued)

OTHER PUBLICATIONS

U.S. Appl. No. 12/819,515, filed Jun. 21, 2010.

*Primary Examiner* — Mohammad Ali
*Assistant Examiner* — Anthony Whittington
(74) *Attorney, Agent, or Firm* — William Heinze; Hoffman Warnick LLC (57) ABSTRACT

A fault interrupt device is tripped by a fault in a power distribution network. A distributed automation controller (DAC) determines a location of and isolates the fault. Power is restored upstream of the fault and downstream power requirement vs. power availability from a secondary source(s) is assessed. The secondary source(s) is connected to the downstream portion if power available is sufficient or after nodes are deactivated to bring power requirements below power available. If a second fault occurs, it is also located and isolated, such as by communication between affected partition DACs of the power distribution network.

9 Claims, 8 Drawing Sheets

(56) References Cited

U.S. PATENT DOCUMENTS

| | | |
|---|---|---|
| 7,154,722 B1 | 12/2006 | Stoupis et al. |
| 7,156,005 B2 | 1/2007 | Cluthe |
| 7,248,978 B2 | 7/2007 | Ransom |
| 7,262,709 B2 | 8/2007 | Borleske et al. |
| 7,317,599 B2 | 1/2008 | Khoroshev et al. |
| 7,415,368 B2 | 8/2008 | Gilbert et al. |
| 7,496,430 B2 | 2/2009 | Mak |
| 7,705,487 B2 | 4/2010 | Chaiquin |
| 7,751,166 B2 | 7/2010 | Stoupis et al. |
| 2007/0266330 A1* | 11/2007 | Friedland et al. ............. 715/764 |
| 2007/0271005 A1* | 11/2007 | Chaiquin .................... 700/292 |
| 2008/0225452 A1* | 9/2008 | Stoupis et al. ................ 361/62 |
| 2009/0046400 A1* | 2/2009 | McCarthy et al. .............. 361/42 |
| 2009/0112375 A1* | 4/2009 | Popescu ....................... 700/292 |
| 2009/0187284 A1* | 7/2009 | Kreiss et al. .................. 700/291 |
| 2009/0273871 A1* | 11/2009 | O'Leary ........................ 361/67 |

FOREIGN PATENT DOCUMENTS

| | | |
|---|---|---|
| WO | 03042823 A1 | 5/2003 |
| WO | 2004040731 A1 | 5/2004 |
| WO | 2007050240 A1 | 5/2007 |
| WO | 2008157695 A2 | 12/2008 |
| WO | 2009076410 A1 | 6/2009 |
| WO | 2010009588 A1 | 1/2010 |
| WO | 2010017041 A2 | 2/2010 |

* cited by examiner

POWER DISTRIBUTION NETWORK FAULT MANAGEMENT

REFERENCE TO PRIOR APPLICATIONS

The current application is related to U.S. patent application Ser. No. 11/978,740, titled "SYSTEM AND METHOD FOR CONTROL OF POWER DISTRIBUTION," which was filed on 30 Oct. 2007 and published on 30 Apr. 2009 as U.S. Patent Application Publication No. U.S. 2009/112,375, and U.S. patent application Ser. No. 12/819,515, titled "SYSTEM AND METHOD FOR CONTROL OF POWER DISTRIBUTION NETWORKS," which was filed on 21 Jun. 2010, both of which are hereby incorporated by reference.

BACKGROUND OF THE INVENTION

The disclosure relates generally to power distribution management, and more particularly, to fault detection, isolation, and resolution (FDIR), as well as systems, methods, and computer products therefore.

In power distribution networks, faults should be isolated as quickly as possible to protect the rest of the network, such as by disconnecting the affected portion of the network. Once the fault is isolated, power can be restored to at least portions of the network that were taken off line by the fault. Embodiments of the invention disclosed and claimed herein provide system, method, and/or computer product for detecting, isolating, and resolving issues surrounding faults in power distribution networks.

Embodiments of the invention disclosed and claimed herein provide a power distribution network fault management method for a power distribution network including at least one controller configured to execute the method responsive to a fault in the power distribution network, and at least one node configured to communicate with and be responsive to the at least one controller, each controller being configured to store network data, including at least one of device data, topology data, and power demand data. Network data is used to determine a region affected by a first fault, and the region affected is isolated by instructing a nearest upstream node and a nearest downstream node to interrupt conductivity to the region affected. Power is restored upstream of the first fault, such as by restoring conductivity through a first fault interrupt device between a source and the region affected, the first fault interrupt device having previously interrupted conductivity responsive to the fault. Power downstream of the first fault is restored responsive to a power requirement and power availability being analyzed. Responsive to power requirement exceeding power availability, a load is disconnected to reduce the power requirement. Once power requirement has been determined to be no more than power available, at least one secondary source is connected to the region affected downstream of the fault including. The power distribution network includes a second partition with a respective controller and network data. When a second fault interrupt device is tripped in response to a second fault in, a location of the second fault interrupt device is determined, as is a location of the second fault. The second fault is isolated, and power is restored upstream, then downstream of the second fault location.

Other embodiments of the invention disclosed and claimed herein provide a computer program product including program code embodied in at least one computer-readable medium, which, when executed, enables a computer system to implement a method of power distribution network fault management in a power distribution network including at least one partition with at least a first controller configured to execute the method responsive to a first fault in the power distribution network. The at least one partition includes at least one node configured to communicate with and be responsive to the at least one controller, and each controller is configured to store network data, including at least one of device data, topology data, and power demand. The computer program product includes program code for using the network data to determine a region affected by the first fault and for isolating a region affected by the first fault by instructing a nearest upstream node and a nearest downstream node to interrupt conductivity to the region affected. Program code is also included for restoring power upstream of the first fault, including program code for restoring conductivity through a device between a source and the affected portion of a power distribution network, the device having interrupted conductivity responsive to the first fault. Additionally, the computer program product includes program code for restoring power downstream of the first fault responsive to a power requirement and a power availability, including program code for analyzing a power requirement and a power availability, disconnecting a load to reduce the power requirement responsive to power availability being less than power requirements prior to disconnecting loads, and connecting at least one source to the region affected downstream of the first fault. If a second fault occurs, program code for communicating with at least a second controller of at least a second partition may be used, the second controller having respective network data, and additional program code may be used to determine a location of and isolate the second fault, restore power upstream of the second fault location, and restore power downstream of the second fault location.

Additional embodiments provide a power distribution network fault management system including at least a first partition controller with at least one computing device, the first partition controller being configured to communicate with at least one intelligent electronic device (IED) configured to control conductivity in a first partition of a power distribution network, the first partition controller also being configured to store network data, including data from and the at least one IED, and to send an instruction to the at least one IED. The system also includes at least one fault interrupt device responsive to at least one IED and a computer program including computer-readable code that, when executed by a computing device of the first partition controller, responsive to a first fault interruption device being tripped, performs a method in which a first fault location of a first fault is determined. An IED controlling a node upstream of the first fault location is instructed to stop conductivity between a source side of an affected segment of the first partition and the first fault location, and an IED controlling a node downstream of the first fault location is instructed to interrupt conductivity between the first fault location and a downstream portion of the affected segment. Power is restored to the source side of the affected segment, including restoring conductivity through the first fault interrupt device. A power requirement of a load on the downstream portion of the affected segment is determined, including analyzing a power requirement of the downstream portion, and power available to the downstream portion of the affected segment from at least one secondary source is determined. Responsive to the power requirement exceeding power availability, conductivity to a portion of the downstream portion is interrupted to reduce the power requirement. Once the power requirement does not exceed power available, at least one secondary source is connected to the downstream portion of the affected segment. If a second fault occurs, program code for communicating with at least a second controller of at least a second partition may be used, the second controller having respective network data, and additional program code may be used to determine a location of and isolate the second fault, restore power upstream of the second fault location, and restore power downstream of the second fault location.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a power distribution network fault management. As used herein, unless otherwise noted, the term "set" means one or more (i.e., at least one) and the phrase "any solution" means any now known or later developed solution.

Figure 1:
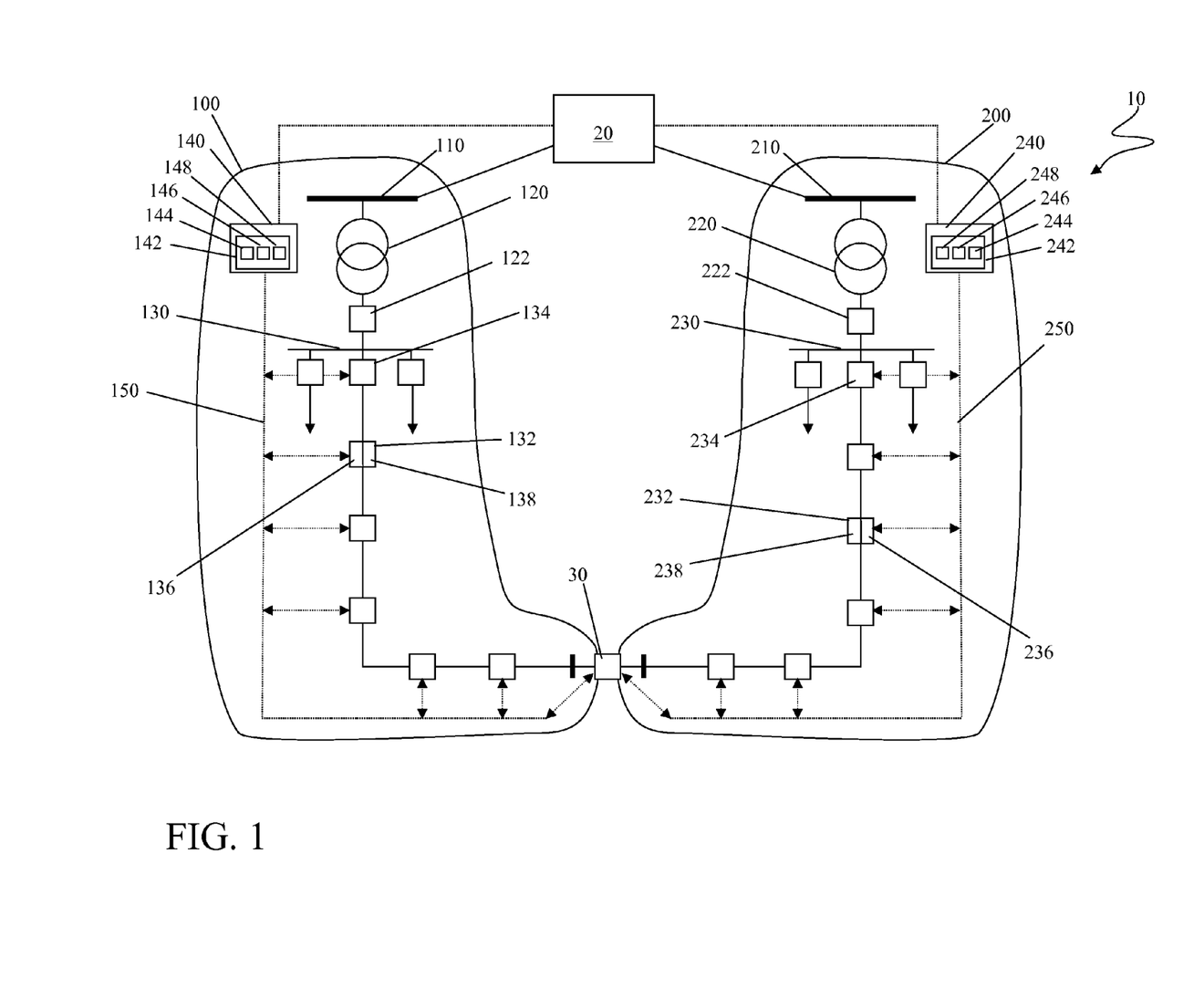
FIG. 1 shows a schematic diagram of a portion of a power distribution network in which embodiments may be employed.

Turning to the drawings, FIG. 1 shows a schematic diagram of a power distribution network 10 according to embodiments of the invention disclosed and claimed herein. Network 10 may include at least one partition 100, 200, each of which may include at least one substation 110, 210 receiving power from at least one source 20 on network 10, such as a gas- or coal-fired power generation facilities, hydroelectric power generation facilities, wind-based power generation facilities, solar power generation facilities, and/or other partitions of network 10. Each substation 110, 210 may include a transformer 120, 220 feeding at least one segment 130, 230 to distribute power to users. A main fault interrupt device 122, 222, such as a main breaker, may be interposed between transformer 120, 220 and segment(s) 130, 230 to protect parts of network 10 and/or partition 100, 200 in the event of, for example, a component failure or the like.

In embodiments, each partition 100, 200 may include a distributed automation controller (DAC) 140, 240 in communication with nodes 132, 232 of segment(s) 130, 230 via a communications arrangement 150, 250, such as an Ethernet-based communications network, a substation bus, or the like. Each DAC 140, 240 may comprise and/or be included in a substation computer and control as many as all nodes 132, 232 of as many as all segments 130, 230 of each substation 110, 210 in embodiments, though other arrangements may be employed within the scope of the invention disclosed and claimed herein. Each segment 130, 230 may include a first fault interrupt device 134, 234 to protect each respective segment 130, 230 and respective components from, for example, component failure, power surges, power failures, and the like in itself and/or other segments, partitions, and/or other connected portions of power distribution network 10. Each node 132, 232 may include at least one control device 138, 238 responsive to at least one intelligent electronic device (IED) 136, 236 in communication with DAC 140, 240 via communications arrangement 150, 250. For convenience, reference will be made to IEDs in this description, but it should be recognized that the IEDs to which reference is made are parts of and/or include respective nodes. It should also be recognized that an IED may control more than one node. In addition, when reference is made to a node being instructed to do something, it should be recognized that instruction could be made to an IED controlling such node and/or to an IED that is part of a node. Examples of control devices 138, 238 that might be included in nodes 132, 232 include switches, breakers, meters, and other devices for power distribution, measuring, and control as may be appropriate, now known and/or later developed and/or discovered. Where a segment first fault interrupt device 134, 234 is included, it also may be in communication with and/or controlled by DAC 140, 240. A connector node 30, such as a tie, may connect two or more partitions 100, 200 responsive to control by a DAC 140, 240, so that one partition may act as a source for another partition in the event a need for additional power arises in the one partition. In embodiments, connector node 30 is normally open, while connector node 30 may be normally closed in other embodiments. DAC 140, 240 may be configured to store network data 142, 242, including one or more of device data 144, 244, topology data 146, 246, and power demand data 148, 248. Some or all of the network data 142, 242 may be received from devices on the network, such as IEDs 136, 236, and/or may be preloaded and/or transmitted upon occasion from other sources. Device data 144, 244 may include one or more of device type, device configuration, environmental data, and other device-related data as may be appropriate and/or desired. Topology data 146, 246 may include one or more of network structure, network protocol data, traffic data, and other topology data as may be appropriate and/or desired. Power demand data 148, 248 may include one or more of current demand, historical demand, projected demand, power usage, and/or other power demand data as may be appropriate and/or desired. Additionally, any or all of the device data, topology data, and the power demand data may be for an entire power distribution network, a partition of a power distribution network, and/or other hierarchical summaries of data down to an individual end-use device.

Figure 2:
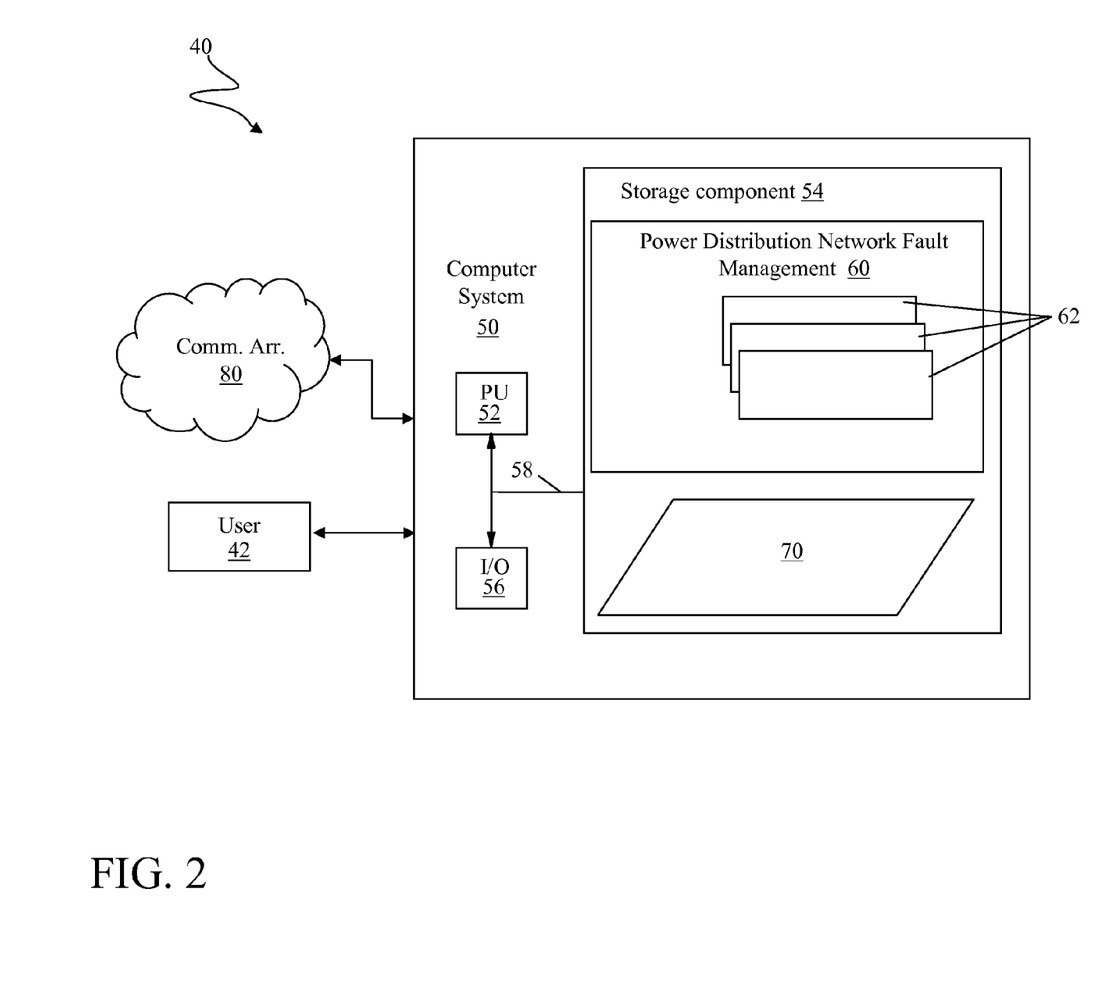
FIG. 2 shows a schematic diagram of a computer system with which embodiments may be employed.

FIG. 2 shows an illustrative environment 40 for power distribution network fault management according to an embodiment. To this extent, environment 40 includes a computer system 50 that can perform a process described herein in order to perform power distribution network fault management. For example, each IED 136, 236 may comprise such a computer system, as may at least one DAC 140, 240. In particular, computer system 50 is shown including a power distribution network fault management program 60, which makes computer system 50 operable to power distribution network fault management by performing a process described herein.

Computer system 50 is shown including a processing component or unit 52 (e.g., one or more processors, PU), a storage component 54 (e.g., a storage hierarchy), an input/output (I/O) component 56 (e.g., one or more I/O interfaces and/or devices), and a communications pathway 58. In general, processing component 52 executes program code, such as power distribution network fault management program 60, which is at least partially fixed in storage component 54. While executing program code, processing component 52 can process data, which can result in reading and/or writing transformed data from/to storage component 54 and/or I/O component 56 for further processing. Pathway 58 provides a communications link between each of the components in computer system 50. I/O component 56 can comprise one or more human I/O devices, which enable a human user 42 to interact with computer system 50 and/or one or more communications devices to enable a system user 42 to communicate with computer system 50 using any type of communications link. In embodiments, a communications arrangement 80, such as networking hardware/software, enables computing device 50 to communicate with other devices in and outside of a substation in which it is installed. To this extent, power distribution network fault management program 60 can manage a set of interfaces (e.g., graphical user interface(s), application program interface, and/or the like) that enable human and/or system users 42 to interact with power distribution network fault management program 60. Further, power distribution network fault management program 60 may manage (e.g., store, retrieve, create, manipulate, organize, present, etc.) the data, such as power distribution network fault management data 70, including network data 140, 240, for example, using any solution.

Computer system 50 can comprise one or more general purpose computing articles of manufacture (e.g., computing devices) capable of executing program code, such as power distribution network fault management program 60, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer product when on at least one computer readable medium. It is understood that the term "computer readable medium" may comprise one or more of any type of tangible medium of expression, now known or later developed, from which a copy of the program code may be perceived, reproduced, or otherwise communicated by a computing device. For example, the computer readable medium may comprise: one or more portable storage articles of manufacture; one or more memory/storage components of a computing device; paper; and/or the like. Examples of memory/storage components include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement a power distribution network management method and/or system and/or computer product that detects, isolates, and resolves faults, such as in a device of a substation, to minimize down time to a fault and/or to minimize a number of users affected by a fault.

The computer program code may be written in computer instructions executable by the controller, such as in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these and/or others now known and/or later developed and/or discovered. To this extent, power distribution network fault management program 60 can be embodied as any combination of system software and/or application software.

Further, power distribution network fault management program 60 can be implemented using a set of modules 62. In this case, a module 62 can enable computer system 50 to perform a set of tasks used by power distribution network fault management program 60, and can be separately developed and/or implemented apart from other portions of power distribution network fault management program 60. As used herein, the term "component" means any configuration of hardware, with or without software, which implements the functionality described in conjunction therewith using any solution, while the term "module" means program code that enables a computer system 50 to implement the actions described in conjunction therewith using any solution. When fixed in a storage component 54 of a computer system 50 that includes a processing component 52, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 50.

When computer system 50 comprises multiple computing devices, each computing device can have only a portion of power distribution network fault management program 60 fixed thereon (e.g., one or more modules 62). However, it is understood that computer system 50 and power distribution network fault management program 60 are only representative of various possible equivalent computer systems that may perform a process described herein. To this extent, in other embodiments, the functionality provided by computer system 50 and power distribution network fault management program 60 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 50 includes multiple computing devices, the computing devices can communicate over any type of communications link. Further, while performing a process described herein, computer system 50 can communicate with one or more other computer systems using any type of communications link. In either case, the communications link can comprise any combination of various types of wired and/or wireless links; comprise any combination of one or more types of networks; and/or utilize any combination of various types of transmission techniques and protocols now known and/or later developed and/or discovered.

As discussed herein, power distribution network fault management program 60 enables computer system 50 to implement a product and/or method of power distribution network fault management, such as will be discussed below and as schematically illustrated, for example, in FIG. 3. Computer system 50 can obtain power distribution network fault management data 70 using any solution. For example, computer system 50 can generate and/or be used to generate power distribution network fault management data 70, retrieve power distribution network fault management data 70 from one or more data stores, receive power distribution network fault management data 70 from another system, and/or the like.

Figure 3:
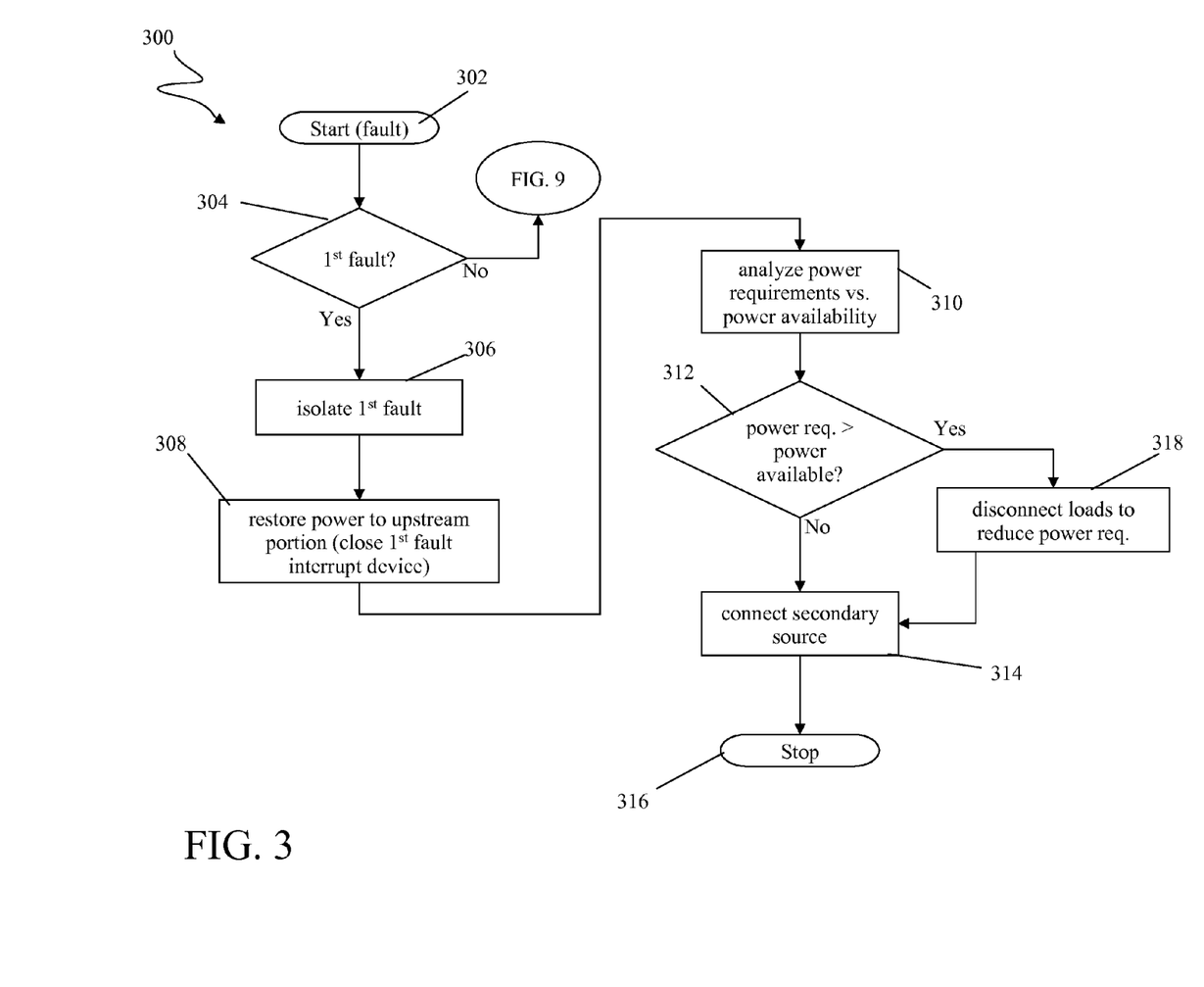
FIG. 3 shows a schematic flow diagram of a method of embodiments.
Figure 4:
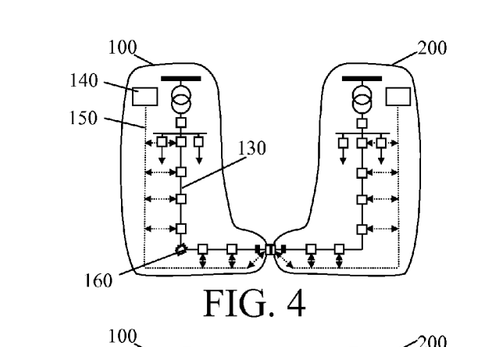
FIGS. 4-8 show a schematic diagram of a portion of a power distribution network as seen in FIG. 1 in an illustration of application of embodiments responsive to a first fault.

In another embodiment, the invention provides a method of providing a copy of program code, such as power distribution network fault management program 60 (FIG. 2), which implements some or all of a process described herein, such as those shown schematically in FIG. 3. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for power distribution network fault management. In this case, a computer system, such as computer system 50 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a method that performs a process described herein on a subscription, advertising, and/or fee basis. That is, a service provider could offer to power distribution network fault management as described herein. In this case, the service provider can manage (e.g., create, maintain, support, etc.) a computer system, such as computer system 50 (FIG. 2), that performs a process described herein for one or more customers. In return, the service provider can receive payment from the customer(s) under a subscription and/or fee agreement, receive payment from the sale of advertising to one or more third parties, and/or the like.

With reference to FIG. 3, embodiments include a power network distribution management method 300 executed or which starts (block 302) when a notification is received of or a check is performed for a fault or tripping of a first fault interrupt device. A check is made to see if it is the first fault (block 304), and if it is not, the method of FIG. 9, described below, is called. If the fault is the first fault, such as indicated by a first fault interrupt device being tripped, a first controller, such as first DAC 140 of partition 100, which may use network data 142, isolates the fault (block 306), then restores power to the upstream portion of the affected segment (block 308). As used herein, "upstream portion" means a portion of the affected segment closer along a distribution pathway, such as a transmission line, to a source or component that may be viewed as a source, such as a substation transformer. In other words, the upstream portion is the portion of the network, along a power distribution pathway, lying between the fault and the source. Likewise, "downstream portion" means a portion of the segment between the fault and a terminus of the segment, or at least the portion of the segment extending away from the fault and the source, along a power distribution pathway.

Power distribution network management continues by analyzing power requirements of the downstream portion, which remains without power, as well as power availability (block 310), such as secondary sources that may be connected to the downstream portion. For example, another partition may be connected to the downstream portion to act as a source, and/or other sources ordinarily not supplying power to the downstream portion may be connected, such as co-generation facilities of commercial customers, solar/wind generators of customers, or other power generating facilities. In some cases, such facilities may already be connected via a normally-open tie or switch or the like such that the switch need only be closed to bring the secondary source on line for the downstream portion. Power requirements are checked against power availability (block 312), and if power requirements are not greater than power available, at least one secondary source is connected to the downstream portion (block 314) and method 300 stops or changes or returns to a monitoring state (block 316). If power requirements exceed power available, embodiments may disconnect loads and/or disable nodes of the downstream portion to reduce power requirements (block 318), then connect at least one secondary source (block 314) and stop or change or return to a monitoring state (block 316). While analysis of power requirements is shown in the same block as analysis of power availability, it should be recognized that these may be separate steps and may be performed in any order. Further, while the order presented has the upstream portion of the affected segment having power restored first, it should be recognized that the downstream portion could be restored first. There is an advantage to restoring the upstream portion first in that the source supplying the affected segment is known to have enough power available for the entire segment, and so will almost certainly have enough power available for the upstream portion, so that once the fault is isolated, power can be restored upstream after minimal downtime and without an analysis of power requirements that would delay restoration of power.

Figure 5:
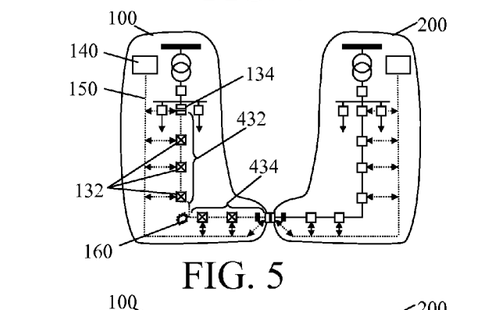
Figure 6:
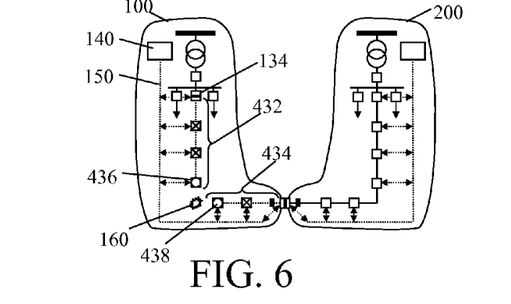
Figure 7:
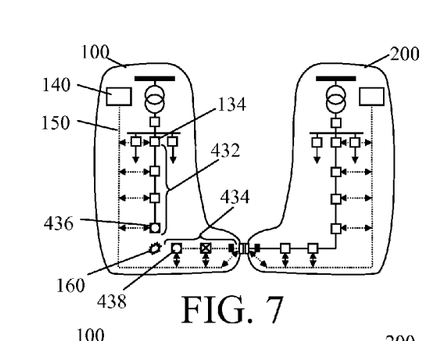

FIGS. 4-8 show a power distribution network 10 like that shown in FIG. 1, in which like reference numerals refer to like components and in which nodes with X are unpowered and nodes with a circle are disabled. Thus, a first fault 160 is shown in FIGS. 4-8 as occurring in a first segment 130 of first partition 100. As seen in FIGS. 5 and 6, a first fault interrupt device 134 is tripped in response to fault 160, discontinuing or stopping or interrupting conductivity therethrough and stopping power flowing through a remainder of first segment 130. As seen in FIGS. 6 and 7, the affected or first segment 130 may be viewed as having a first upstream portion 432 and a first downstream portion 434. As also seen in FIG. 6, DAC 140 isolates fault 160 by disabling or instructing IEDs 436, 438 closest to the fault to discontinue or interrupt conductivity to the location of the fault 160 so that power will not flow to fault 160, and power may be restored to remaining portions of first segment 130. For example, first fault interrupt device 134 may be reset, as seen in FIG. 7, to restore power to the first upstream portion 432 of the first segment 130. Once a determination has been made that power requirements of first downstream portion 434 do not exceed power available from secondary sources, such as second partition 200, power may be restored to first downstream portion 434. For example, power may be restored by connecting at least one secondary source to first downstream portion 434, such as by enabling conductivity through connector 30 to allow power to flow from second partition 200 to first downstream portion 434, as seen, for example, in FIG. 8.

Figure 8:
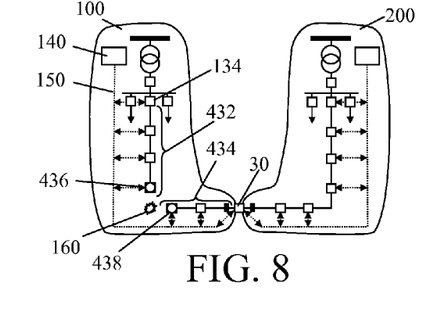
Figure 9:
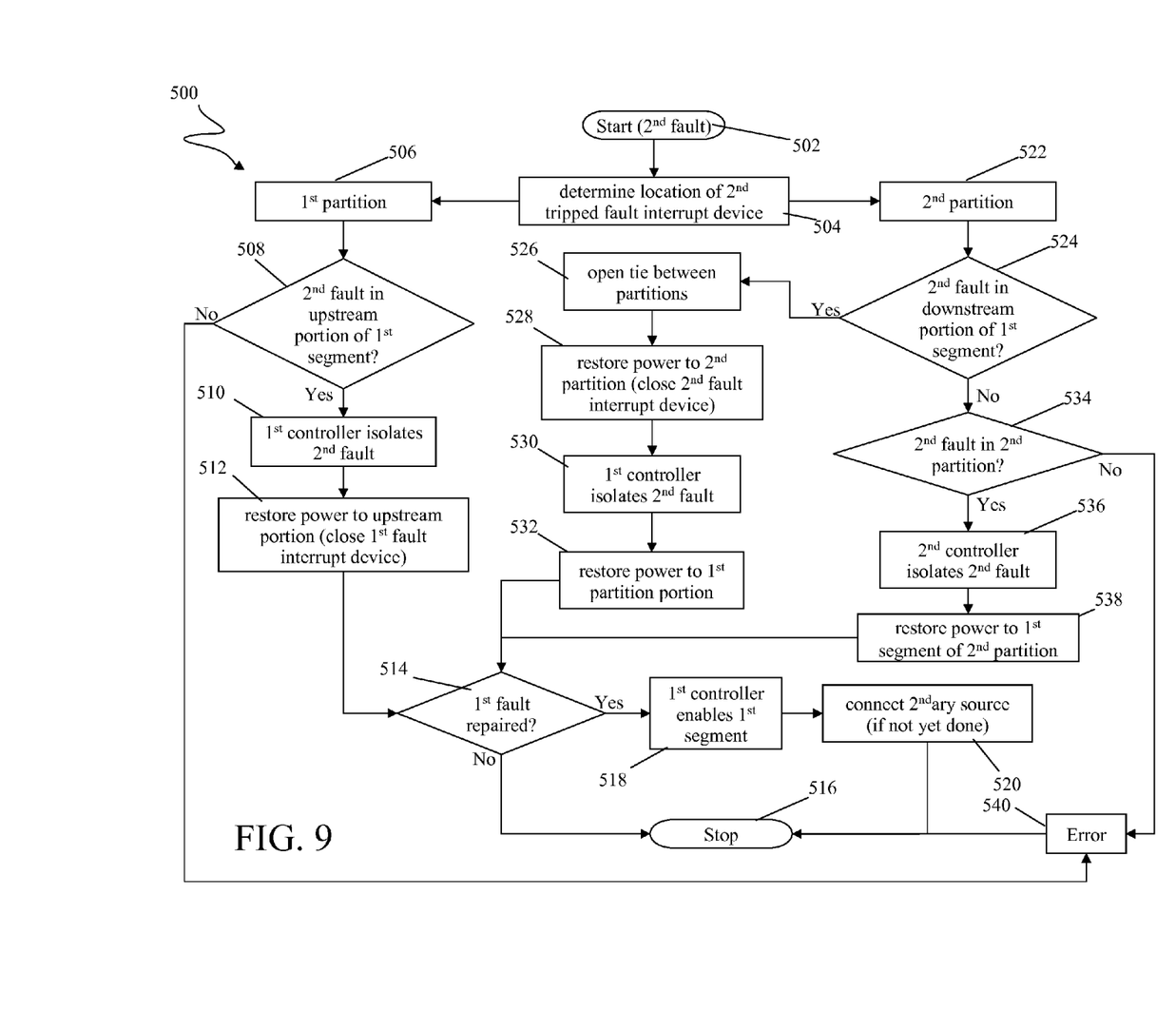
FIG. 9 shows a schematic flow diagram of a method of embodiments.

If another fault occurs in the restored network shown in FIG. 8, power network management distribution according to embodiments may be achieved using additional steps, such as those shown schematically in FIG. 9. It should be noted that the steps shown in FIG. 9 are an application of those shown in FIG. 3, with specificity applied due to a particular situation, i.e., a fault has occurred in a portion of a power distribution network that has already been managed to recover from a fault, such as by connecting one partition to another to act as a power source. Thus, notification/determination of tripped fault device, isolation of fault, power restoration upstream of the fault, power requirements/availability analysis, and power restoration downstream of the fault are performed, but with specific circumstances taken into account.

Figure 10:
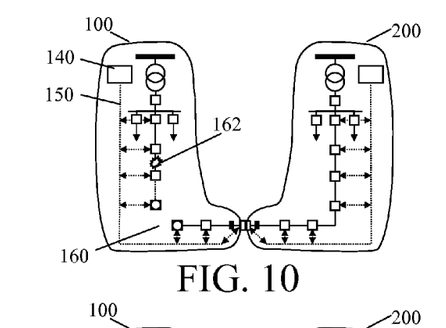
FIGS. 10-14 show a schematic diagram of a portion of a power distribution network as seen in FIG. 8 in an illustration of an application of embodiments responsive to a second fault in a first location.
Figures 11, 12:
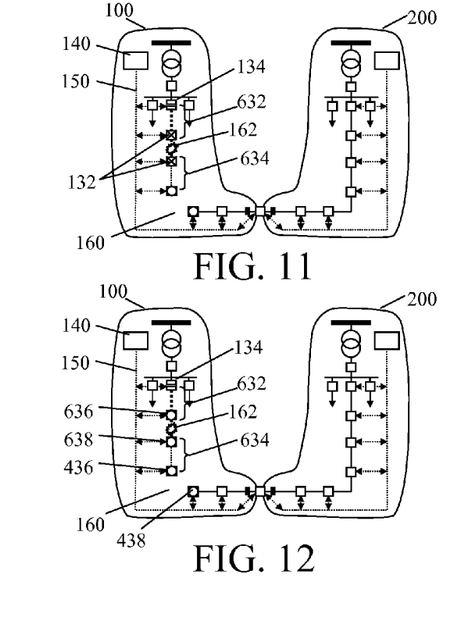

As seen in FIG. 9, a method 500 of embodiments starts (block 502) when it receives notification of or determines a location of a tripped second fault interrupt device (block 504), such as by using DAC 240, which may use network data 242. If the first fault interrupt device is located in the first partition (block 506), then a check is made as to whether the second fault is in first upstream portion 432 of first segment 130 (block 508). An example of such a situation and a response according to embodiments is shown, for example, in FIGS. 10-14. Thus, a second fault 162 is shown in FIG. 10, and first fault interrupt device 134 may be seen as a second fault interrupt device since it trips in response to second fault 162, as shown in FIGS. 11 and 12, stopping power to first upstream portion 432 of first segment 130. First upstream portion 432 itself is now divided into second upstream portion 632 and second downstream portion 634 by second fault 162, as shown in FIG. 11.

Figure 13:
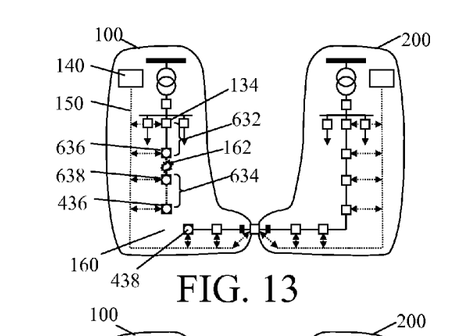
Figure 14:
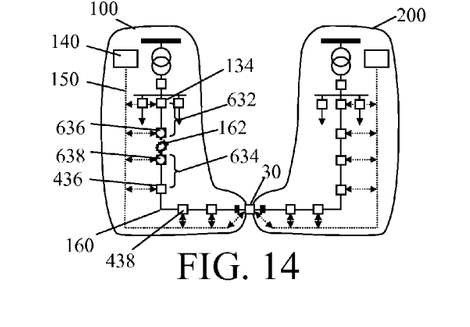
Figure 15:
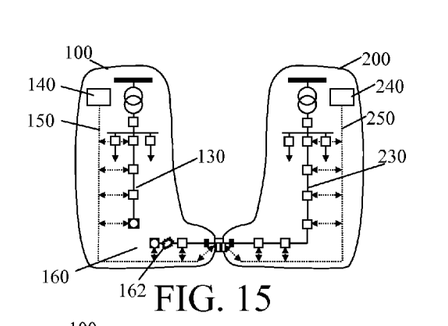
FIGS. 15-20 show a schematic diagram of a portion of a power distribution network as seen in FIG. 8 in an illustration of an application of embodiments responsive to a second fault in a second location.
Figure 16:
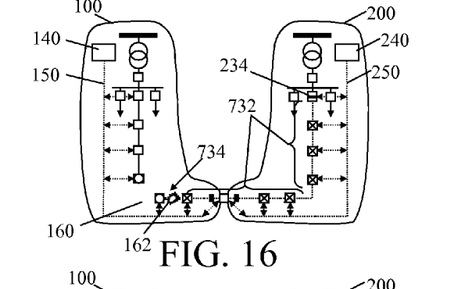
Figure 17:
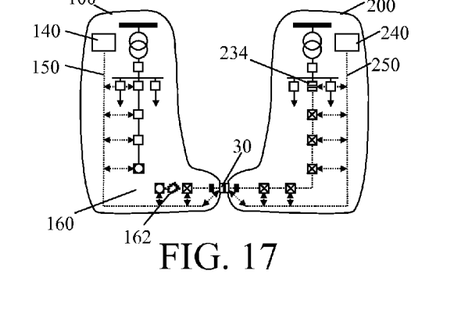

First controller 140 isolates second fault 162 (block 510), such as by disabling or instructing nodes 636, 638 closest to second fault 162 to discontinue conductivity to second fault 162, as seen in FIG. 12. Power is restored to second upstream portion 632 (block 512), such as by resetting first fault interrupt device 134 (FIG. 13). A check is made to see if first fault 160 has been repaired (block 514). If not, the iteration of method 500 stops or changes or returns to a monitoring state (block 516), since, in this case, no secondary source can be connected to remaining portions of first segment 130. If first fault 160 has been repaired, first controller 140 re-enables first segment 130 (block 518), such as by instructing IEDs 436, 438 to re-enable conductivity to the location of first fault 160, and a secondary source is connected (block 520), such as by connecting second partition 200 to first downstream portion 434 by enabling connector 30.

Figure 18:
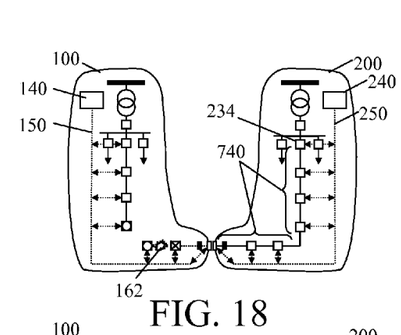
Figure 19:
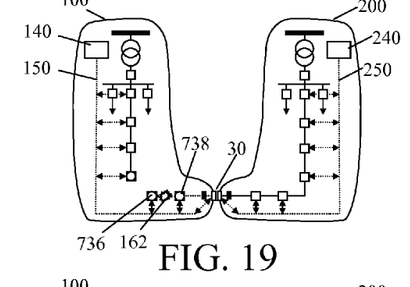
Figure 20:
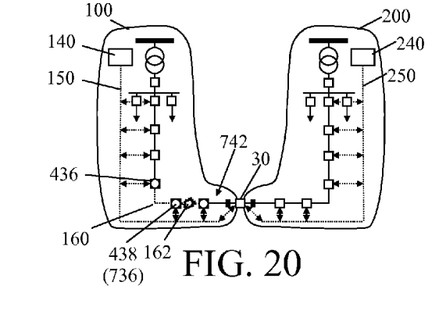
Figure 21:
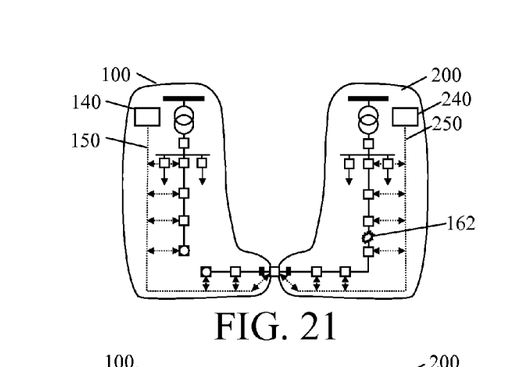
FIGS. 21-25 show a schematic diagram of a portion of a power distribution network as seen in FIG. 8 in an illustration of an application of embodiments responsive to a second fault in a third location.
Figure 22:
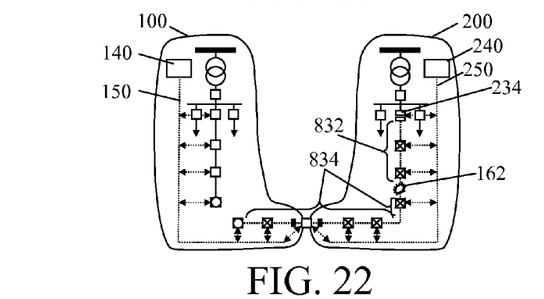

With reference to FIG. 9, if the tripped second fault interrupt device is in the second partition (block 522), then a check is made to determine whether the second fault is in the first downstream portion 434 of first segment 130 (block 524). If so, then, as seen in FIGS. 15-20, a second upstream portion 732 between second fault 162 and second fault interrupt device 234, and a second downstream portion 734 between first fault 160 and second fault 162 are formed. To initially isolate second fault 162, connector 30 may be opened (block 526, FIG. 17), and power may be restored to second partition portion 740 of second upstream portion 732 (block 528, FIG. 18). For example, power may be restored to second partition 200 by resetting second fault interrupt device 234 as shown in FIG. 18. First controller 140 may further isolate second fault 162 (block 530, FIG. 19), such as by disabling or instructing IEDs 736, 738 closest to second fault 162 to discontinue or interrupt conductivity to the location of second fault 162. Power may be restored to a first partition portion 742 of second upstream portion 732 (block 532) by, as seen, for example, in FIG. 20, reconnecting second partition 200 via connector 30. In embodiments, a check may be made to see if first fault 160 has been repaired (block 514). If not, the iteration of method 500 stops, but if first fault 160 has been repaired, first controller 140 instructs IEDs 436, 438 to re-enable conductivity to the location of first fault 160, allowing power to flow to the location of first fault 160 from the first fault interrupt device 134.

Figure 23:
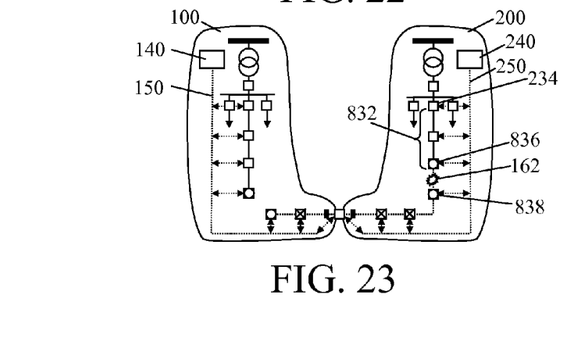
Figure 24:
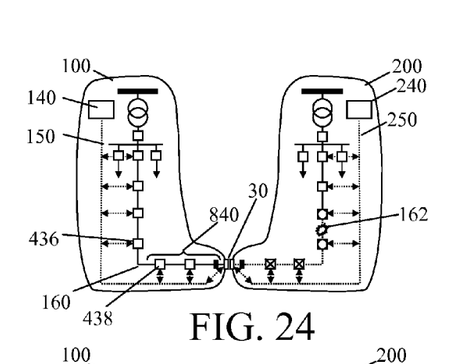
Figure 25:
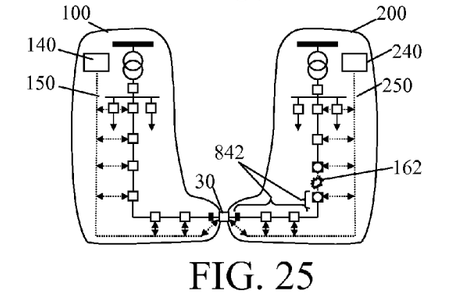

If the tripped second fault interrupt device is in the second partition and the second fault is also in the second partition (block 534, FIGS. 22-25), second controller 240 isolates second fault 162 (block 536, FIGS. 23-25) and second downstream portion 834, such as by instructing IEDs 836, 838 to discontinue or interrupt conductivity to second fault 162. Second DAC 240 may restore power to second upstream portion 832 of first segment 230 of second partition 200 (block 538, FIG. 23), such as by resetting second fault interrupt device 234. In embodiments, a check may be made to see if first fault 160 has been repaired (block 514). If not, the iteration of method 500 stops or changes or returns to a monitoring state (block 516), but if first fault 160 has been repaired, blocks 518 and 520 may be executed, such as by first controller 140 instructing IEDs 436, 438 to re-enable conductivity to the location of first fault 160 (block 518), allowing power to flow to the location of first fault 160 from the first fault interrupt device 134. If the answer in block 508 or block 534 is No, an error may be noted (block 540), and the method may stop (block 516).

Employing embodiments as disclosed herein may result in more expedient isolation and resolution of faults in power distribution networks. While particular scenarios have been disclosed, it should be apparent that embodiments may be employed to isolate and resolve faults in other locations in a power distribution network within the spirit of the invention described and claimed herein.

The corresponding structures, materials, acts, and equivalents of any and all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A power distribution network fault management system comprising:
    at least a first partition controller including at least one computing device, the first partition controller being configured to communicate with at least one intelligent electronic device (IED) configured to control conductivity in a first partition of a power distribution network, the first partition controller also being configured to store network data, including data from and the at least one IED, and to send an instruction to the at least one IED;
    at least one fault interrupt device responsive to at least one IED; and
    a computer program including computer-readable code that, when executed by a computing device of the first partition controller, responsive to a first fault interruption device being tripped, performs a method comprising:
        determining a first fault location of a first fault;
        instructing an IED controlling a node upstream of the first fault location to stop conductivity between a source side of an affected segment of the first partition and the first fault location;
        instructing an IED controlling a node downstream of the first fault location to interrupt conductivity between the first fault location and a downstream portion of the affected segment;
        restoring power to the source side of the affected segment, including restoring conductivity through the first fault interrupt device;
        determining a power requirement of a load on the downstream portion of the affected segment, including analyzing a power requirement of the downstream portion;
        determining power available to the downstream portion of the affected segment from at least one secondary source;
        responsive to the power requirement exceeding power availability, interrupting conductivity to a portion of the downstream portion of the affected segment to reduce the power requirement;
        connecting at least one secondary source to the downstream portion of the affected segment; and
        responsive to a second fault interrupt device being tripped after connecting the at least one secondary source to the downstream portion of the affected segment:
            determining a location of the second fault interrupt device;
            determining a second fault location of the second fault;
            isolating the second fault;
            restoring power upstream of the second fault location; and
            restoring power downstream of the second fault location.

2. The power distribution network fault management system of claim 1, further comprising a first tie configured to selectively enable conductivity between the first partition and a secondary source, and wherein the connecting at least one secondary source includes enabling conductivity through the first tie.

3. The power distribution network fault management system of claim 1, wherein the determining a power requirement further comprises determining a disconnectable downstream portion by using at least a predetermined prioritization rule based on at least the network data.

4. The power distribution network fault management system of claim 1, wherein the first partition includes at least one tie configured to connect the first partition to at least one secondary source.

5. The power distribution network fault management system of claim 4, wherein the secondary source includes at least the second partition, in communication with the first partition controller, at least the first and second partition controllers being configured to selectively exchange information including at least one of a respective power requirement, power availability, and fault information.

6. The power distribution network fault management system of claim 5, wherein, responsive to the second fault interrupt device being in the second partition, the restoring power to the upstream portion includes the second controller resetting the second fault interrupt device, and, responsive to the second fault location being in the first partition, the isolating the second fault includes disconnecting the second partition from the first partition and the first controller instructing at least one IED controlling a node immediately upstream and a node immediately downstream of the second fault location to interrupt conductivity to the fault location, and the restoring power downstream of the second fault location includes reconnecting the second partition to the first partition.

7. The power distribution network fault management system of claim 5, wherein, responsive to the second fault interrupt device being in the second partition, the restoring power to the upstream portion includes the second controller resetting the second fault interrupt device, and, responsive to the second fault location being in the second partition, the isolating the second fault includes the second controller instructing at least one IED controlling a node immediately upstream and a node immediately downstream of the second fault location to interrupt conductivity to the fault location, and the restoring power downstream of the second fault location includes, responsive to the first fault having been repaired, the first controller instructing at least one IED controlling a node of the first partition immediately upstream and a node of the first partition immediately downstream of the first fault location to re-enable conductivity and reconnecting the second partition to the first partition.

8. The power distribution network fault management system of claim 5, wherein, responsive to the second fault interrupt device being in the first partition, the restoring power to the upstream portion includes the first controller resetting the second fault interrupt device and, responsive to the second fault location being in the upstream portion of the first partition, the isolating the second fault includes first controller instructing at least one IED immediately upstream and at least one IED immediately downstream of the second fault location to interrupt conductivity to the fault location, and the restoring power downstream of the second fault location includes, responsive to the first fault having been repaired, the first controller instructing at least one IED controlling a node of the first partition immediately upstream and a node of the first partition immediately downstream of the first fault location to re-enable conductivity.

9. The power distribution network fault management system of claim 4, wherein the restoring power downstream of the second fault location includes:
- determining a power requirement of a load downstream of the second fault location;
- determining a power available for a load downstream of the second fault location; and
- responsive to the power requirement exceeding the power availability, stopping conductivity to the load downstream of the second fault location to reduce the power requirement.

* * * * *